Sept. 12, 1961  A. S. VOLPIN  2,999,510
AUTOMATIC LUBRICANT-SEALED PLUG VALVE
Filed July 5, 1957  3 Sheets-Sheet 1
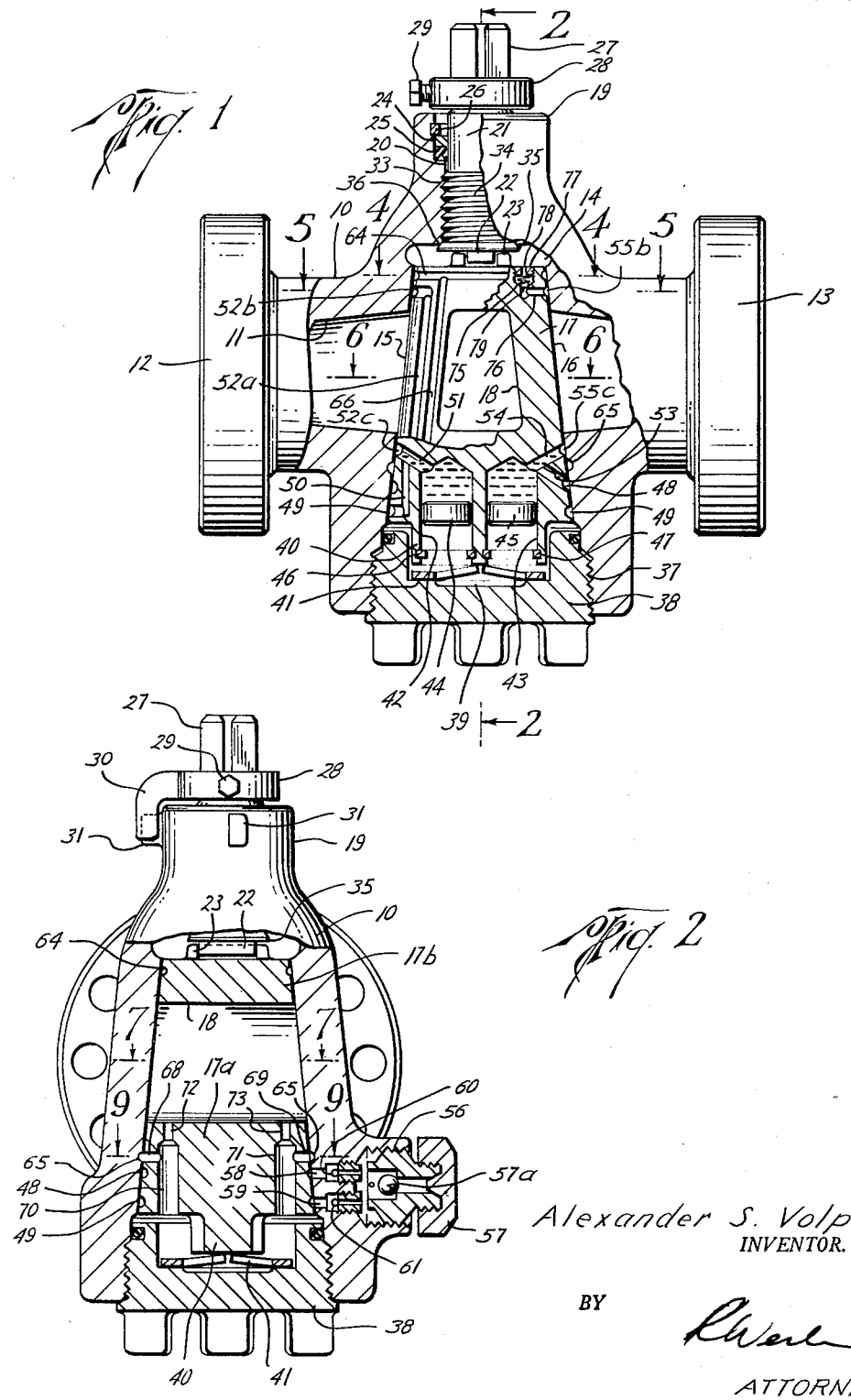
Alexander S. Volpin
INVENTOR.
BY
ATTORNEY

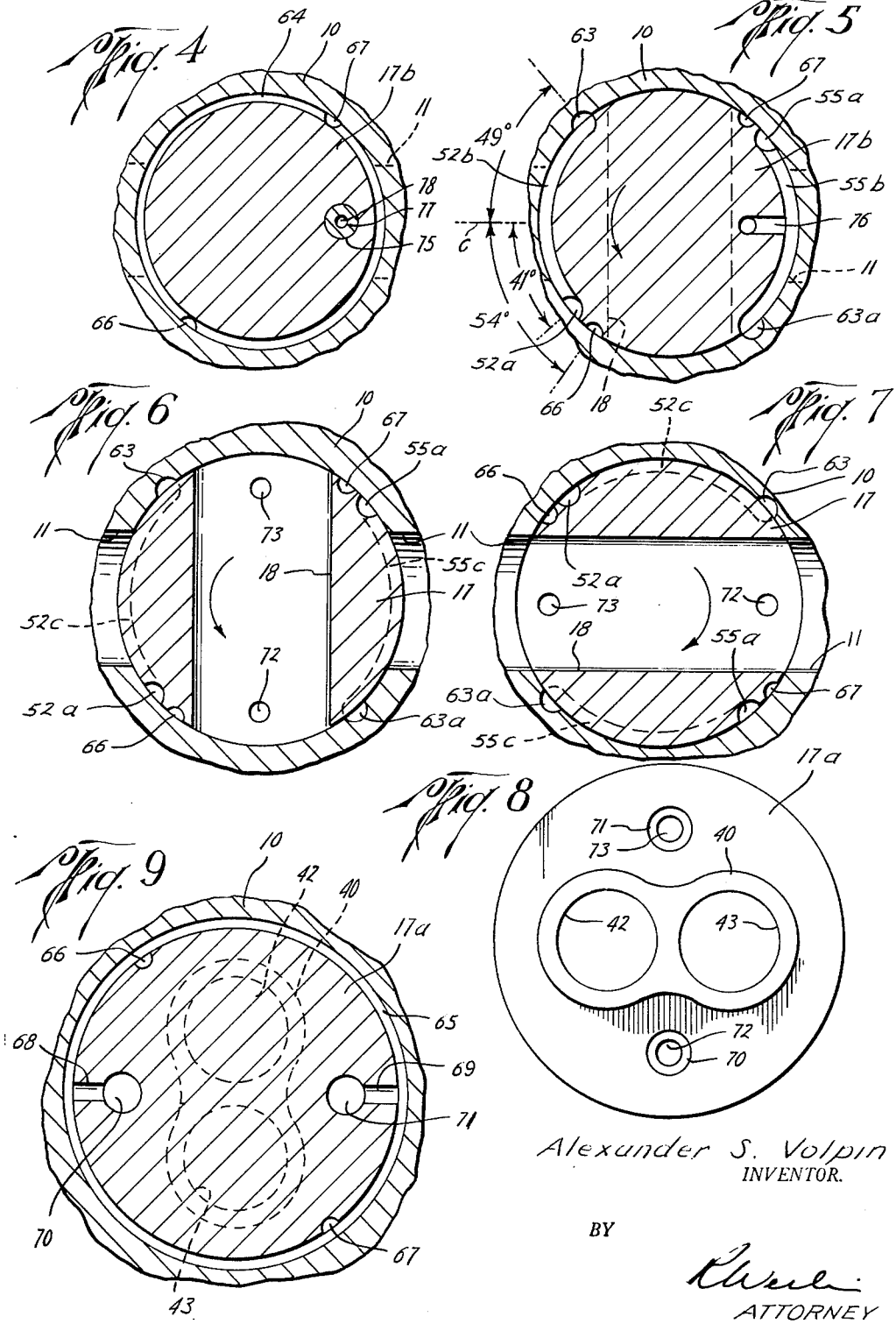

United States Patent Office 2,999,510
Patented Sept. 12, 1961

2,999,510
AUTOMATIC LUBRICANT-SEALED PLUG VALVE
Alexander S. Volpin, 10200 W. Broadview Drive,
Miami Beach 54, Fla.
Filed July 5, 1957, Ser. No. 670,320
8 Claims. (Cl. 137—246.12)

This invention relates to automatic lubricant-sealed plug valves and more particularly to automatic lubricant-sealed plug valves of the solid or one-piece plug type.

Plug valves particularly of the solid or one-piece plug type, depend for sealing in the closed position primarily upon close-fitting engagement of comparatively large surface areas of the plug member and the plug seat in the body. While, in conventional designs, various types of lubricant-sealant groove systems are employed between these surfaces surrounding the opposite ends of the flow port, the very large areas exposed to line pressures necessarily make it extremely difficult to prevent leakage because of the difficulty of making the engaging plug and seat surfaces mate or match completely throughout the entire areas of the engaging surfaces. Extensive grinding, lapping and the like, of the mating parts, which are necessarily expensive operations, are employed in an effort to solve this inherent difficulty but even though effective in some cases and under some conditions, temperature or pressure conditions encountered in use may cause sufficient warping or distortion of the plug member or body to greatly reduce or destroy the efficiency of the seal.

Lubricant sealing is conventionally employed both for sealing against leaks and to reduce the torque required to turn the plug member between open and closed positions. However, until the instant invention no practical automatic sealing system for solid plug valves was available for high pressure services. Present plug valves using an automatic lubrication arrangement must employ a segmented plug, the parts being resiliently urged apart to allow line pressure to reach a lubricant reservoir. My invention overcomes this inherent shortcoming and in doing so I have materially reduced manufacturing costs.

The present invention, therefore, has for its primary object the provision of an automatic sealing system for solid plug valves which obviates the defects of existing arrangements.

An important object is to provide a system for one-piece plug valves which is effective to assure automatic sealing while maintaining full lubrication of the plug member.

An additional object is to provide an automatic lubricant-sealant system which employs in combination with a full port lubricating groove system for each side of the valve, a cooperating auxiliary leak-interceptor groove system which provides a low-pressure path or conduit from the upstream source of leakage to the respective lubricant-sealant reservoirs to effectuate the automatic functioning of the downstream lubricant-sealing system.

Another object is the provision of a dual automatic lubricant-sealant system for solid plug type plug valves employing independent lubricant-sealant reservoirs for automatically feeding the downstream groove system, and having a common supply means for introducing lubricant-sealant simultaneously into both reservoirs.

Still another object is the provision of two or more passages connecting the flow port in the plug member with the interior of the portion of the plug chamber exteriorly of one end of the plug member, and proximate a lubricant reservoir having an exposed barrier therein, said passages functioning in response to fluid flow through the flow port to exhaust matter entrapped in said chamber portion about said reservoir.

A still further object is the provision of means connected with the lubricant groove system for applying lubricant pressure to an end of the plug member in order to unseat the same to enable the plug member to be turned.

Other and more specific objects and advantages of this invention will become more readily apparent from the following detailed description when read in conjunction with the accompanying drawing which illustrates one useful embodiment in accordance with this invention.

In the drawing:

FIG. 1 is a side elevational view, partly in axial section, of a plug valve in accordance with one embodiment of this invention;

FIG. 2 is a transverse partly sectional view taken generally along line 2—2 of FIG. 1;

Figure 3:
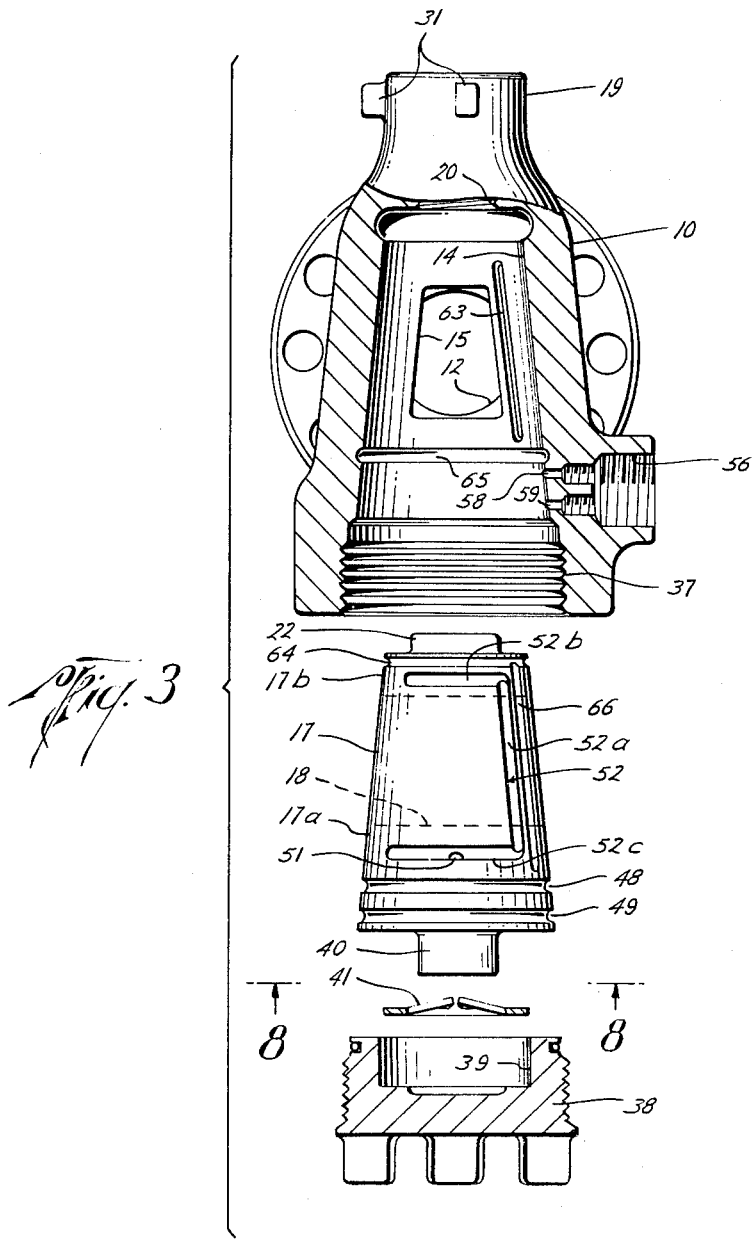
FIG. 3 is an exploded view of the principal elements of the valve, some of the parts being in transverse section.

FIGS. 4, 5 and 6 are cross-sectional views along lines 4—4, 5—5 and 6—6, respectively, of FIG. 1, the plug member being shown in the closed position;

FIG. 7 is a cross-sectional view along line 7—7 of FIG. 2, but showing the plug member in the open position;

FIG. 8 is an end view of the plug member looking upwardly along line 8—8 of FIG. 3; and FIG. 9 is a cross-sectional view taken along line 9—9 of FIG. 2.

Referring to the drawing, the valve casing 10 is provided with the flowway 11 passing through end connections 12 and 13, either of which may be the inlet and the other the outlet. A plug chamber 14 intersects flowway 11 providing the opposite flow ports 15 and 16 and defining a seat for a rotatable plug member 17 which is of solid or one-piece construction and provided with a transverse flow port 18 adapted to register with ports 15 and 16 when the plug member is in the open position.

In the illustrative embodiment plug member 17 is shown as tapered, but it will be understood that the plug member also may be cylindrical, the improvements of the present invention being applicable to plug valves employing plug members of either shape. Moreover, the plug member may be upwardly tapered, as shown, or may be downwardly tapered in accordance with conventional designs. For purposes of this description the larger lower end portion of the plug member which generally underlies flow port 18 is designated by the numeral 17a, while the smaller upper end portion generally above flow port 18 is designated by the numeral 17b.

Casing 10 is provided with an integrally formed upwardly extending hollow bonnet 19 having a bore 20 through which a stem 21 extends into plug chamber 14. The inner end of stem 21 is provided with a generally rectangular tang or lug 22 which is adapted to be engageably received between a pair of spaced ears 23—23 mounted on the upper end of plug member 17, whereby to transmit rotative torque from the stem to the plug member.

The outer end portion of bore 20 is counterbored to form the stuffing box 24 adapted to contain packing 25 for sealing between the stem and wall of bore 20. A snap ring 26 is installed in the stuffing box to lock the packing in place. Stem 21 is provided with non-round end portion 27 for reception of a turning wrench or wheel (not shown). An orienting ring 28 is locked about end portion 27 by means of a set screw 29 and is provided with a depending ear 30 (FIG. 2) which is adapted in response to turning movement of stem 21 to swing between a pair of stop lugs 31—31 positioned 90° apart about the outer periphery of bonnet 19 to limit turning of the plug through an angle of 90° between the valve-opening and valve-closing positions.

The inner end portion of bore 20 below stuffing box 24 may be provided with threads 33 adapted to threadably receive stem 21 which is provided adjacent its inner end with a section of threads 34. Between the latter and lug 22, stem 21 is provided with an enlarged downwardly tapered shoulder 35 which is adapted to engage a tapered seat 36 formed at the inner end of bore 20. Engagement of shoulder 35 with seat 36 is adapted to form a back-seal which will permit closing off bore 20 from the plug chamber to allow replacement of the packing in the stuffing box when the valve is under pressure, as will be more fully described hereinafter.

The lower end of plug chamber 14 which is the larger diameter end of the chamber, opens through the bottom of casing 10 through an internally threaded opening 37 which is adapted to receive a threaded closure cap 38. The inner end of the latter is provided with a recess 39 adapted to receive a boss 40 which is substantially narrower than the plug member, extends transversely thereof, and projects downwardly from the lower end face of lower portion 17a of the plug member. The bottom of recess 39 forms a seat for a flat spring 41 which is adapted to bear against boss 40 and resiliently urges the latter upwardly in chamber 14 when cap 38 is screwed into opening 37 to thereby hold the plug member on the seat formed by the wall of chamber 14. When cap 38 is screwed into place, recess 39 will constitute an extension of the portion of plug chamber 14 below the lower end of plug member 17.

A pair of laterally spaced cylindrical chambers 42 and 43 extend upwardly into the lower end portion 17a of the plug member, the upper ends of the chambers being closed and the lower ends opening through the lower end face of boss 40. The chambers are conveniently arranged along the longitudinal center of boss 40 which is on a line generally transverse to the longitudinal axis of the plug flow port. Chambers 42 and 43 comprise reservoirs for lubricant-sealant material to be fed to the groove systems of the valve as will be subsequently described, and are fitted with sealed pistons 44 and 45, respectively, which are slidably disposed in the reservoirs. Lock rings 46 and 47, respectively, are positioned in the outer or lower ends of the respective reservoirs to prevent outward displacement of the pistons from the reservoirs.

To feed lubricant-sealant to the reservoirs, a pair of vertically spaced upper and lower circumferential supply grooves 48 and 49, respectively, are provided about lower portion 17a of the plug member. Lower supply groove 49 communicates with the inner (upper) end of reservoir 42 through a channel 50 which extends into the body of plug portion 17a and communicates with a feed passage 51 which connects the inner end of reservoir 42 to a generally C-shaped sealing groove 52 (see FIG. 3) formed on one side of the plug member in the exterior surface thereof. Upper supply groove 48 communicates with the inner (upper) end of reservoir 43 through a channel 53 which extends into the body of plug portion 17a and communicates with a feed passage 54 which connects the inner end of reservoir 43 to a second generally C-shaped sealing groove 55 formed in the exterior surface of the plug member diametrically opposite sealing groove 52.

At a point in casing 10 generally opposite the positions of grooves 48 and 49, an internally threaded socket 56 is provided into which is screwed a grease-injection fitting 57 of generally conventional design, having a check valve 57a positioned therein. From the bottom of socket 56, a pair of injection passages 58 and 59 communicate separately with upper and lower supply grooves 48 and 49, respectively. The injection passages are fitted with check valves 60 and 61, respectively. With this arrangement it will be seen that a supply of lubricant-sealant may be injected into socket 56 through a single injection fitting to feed both reservoirs simultaneously from the single supply fitting irrespective of the angular position of the plug member.

Each of the sealing grooves 52 and 55 are shaped so as to concentrically enclose the major portion of the periphery of the respective flow ports 15 and 16 when the plug member is in the closed position, as best seen in FIGS. 1 and 3. Where the flow ports are of the generally rectangular shape illustrated, the grooves in the surfaces of the plug member will be shaped to enclose three sides of the rectangle, as shown. Groove 52 will thus comprise the vertical branch 52a connecting the upper and lower horizontal branches 52b and 52c. Groove 55 is similarly formed by a vertical branch 55a and horizontal branches 55b and 55c. The fourth side of each groove is formed by a vertically extending bridging groove 63 and 63a for the grooves 52 and 55, respectively, disposed in the wall of chamber 14 adjacent one side of each of the flow ports (see FIG. 3). These bridging grooves are positioned to bridge the open sides of the C-shaped grooves surrounding that flow port when the plug member is in the closed position by connecting the ends of the horizontal groove branches to each other. Thus when the plug member is in the closed position the C-shaped grooves with their related bridging grooves will form a closed circuit surrounding each of the flow ports 15 and 16, and lubricant-sealant may be conducted from the respective reservoirs to these closed-circuit or full port groove arrangements to provide the desired lubricant seals about the flow ports. In the open position of the plug member, when automatic sealing is not required, the plug member will have been turned 90° thereby moving the C-shaped grooves away from the bridging grooves and breaking the groove circuits. It will be understood that other types of known bridging arrangements may be employed in which a different groove segment may be made separable to make or break the groove circuit in accordance with the movement of the plug member.

In order to effect automatic sealing of the valve in the closed position by automatic feeding of the sealant-lubricant to the sealing groove systems, line fluid pressure from the upstream or high pressure side of the valve must be admitted into the lower portion of the plug chamber beneath the lower end of the plug member so as to act on pistons 44 and 45 in the respective reservoirs to urge lubricant-sealant therefrom into the respective groove circuits. In more conventional plug valves, as previously noted, this may be effected by using a segmented plug, the upstream portion of which is displaceable by the line pressure sufficiently to admit the upstream line pressure into the lubricant-sealant reservoirs communicating with the downstream groove system.

The present invention avoids previous arrangements with their undesirable effects by providing an auxiliary groove system by which pressure fluid leakage between the plug member and the plug seat is effectively channelled into the plug chamber to provide the pressure required to actuate the barrier seals or pistons in the reservoirs to urge lubricant-sealant therefrom into the downstream groove system.

This auxiliary groove system includes a pair of circumferential grooves disposed completely about the upper and lower ends and the sides of the plug member. These grooves may both be either on the plug surface or in the wall of the plug chamber, or one may be in the plug surface and the other in the plug chamber wall. The latter arrangement is shown in the illustrative embodiment in which, as best seen in FIG. 3, an upper circumferential groove 64 is provided in the surface of upper portion 17b of the plug member at a level above the horizontal branches 52b and 55b of the C-shaped grooves and a lower circumferential groove 65 is disposed in the wall of plug chamber 14 surrounding lower plug portion 17a at a level intermediate upper supply groove 48 and the lower horizontal branches 52c and 55c of the C-shaped grooves. Grooves 64 and 65 are connected to each other at diametrically opposite points by a pair of vertically extending transfer grooves 66 and 67 formed in the outer surface of plug member 17, although one or both of the transfer grooves may be in the wall of the plug chamber.

As best seen in FIGS. 2 and 9, lower groove 65 registers with the outer ends of a pair of short passages 68 and 69 which extend inwardly from the surface of lower plug portion 17a on diametrically opposite sides thereof into communication with passages 70 and 71, respectively, which extend generally vertically through lower plug portion 17b and open at their upper ends into the interior of plug port 18 and at their lower ends into the plug chamber beneath the lower end of the plug member on opposite sides of boss 40. Passages 70 and 71 have their upper end portions 72 and 73, respectively, reduced somewhat in diameter and these passages are spaced apart along the longitudinal axis of flow port 18. Passages 68, 69, 70 and 71, together with the leak interceptor grooves 64, 65 and 66 and 67, provide low resistance paths for rapid transfer of line pressure entering any point in the leak-interceptor grooves to the plug chamber in the area of the lubricant-sealant reservoirs so that this pressure can act automatically upon the movable barrier seal in the downstream reservoir to force lubricant-sealant into the downstream sealant groove system. Similarly, any leakage of line pressure into flow port 18, when the plug member is in the closed position, will move through passages 70 and 71 into the lower portion of the plug chamber. Also, when the plug member is in the open position and fluid is flowing through the valve, the arrangement and form of passages 70 and 71 are calculated to produce a suction effect in the portion of the plug chamber below the plug member which will be effective to suck out any detritus which might tend to collect in this portion of the plug chamber.

As best seen in FIG. 5 and in the several other cross-sectional views, the circumferential grooves 64 and 65 and the vertical leak transfer grooves 66 and 67 constituting the leak-interceptor groove system are so dimensioned and positioned with respect to the lubricant-sealant groove systems as to avoid any over-lapping or intersection of the leak-interceptor system with the sealant groove systems throughout the limited angular movement of the plug member so that there will be no interference between these systems.

As shown in FIG. 5, the horizontal lubricant-sealant groove elements such as 52b and 55b, while having an arcuate length of 90°, are positioned on the plug member so that when the plug member is in the closed position, these groove elements will be non-symmetrical about the center line C corresponding to the longitudinal axis of flowway 11. As illustrated in FIG. 5, by way of example, the groove portions on opposite sides of this center line will be 41° and 49°, the positions of the longer and shorter portions with respect to the center line being reversed for grooves 52b and 55b, as well as for grooves 52c and 55c.

This off-center arrangement of horizontal groove elements will place one end of each groove farther from the adjacent side edge of the plug port than the opposite end of that groove, thereby providing adjacent one end of each horizontal groove a relatively wide space relative to the adjacent edge of the plug port 18. The leak transfer passages 66 and 67 are positioned in these wider spaces thus provided between the sealing groove portions 52a and 55a and the respectively adjacent edges of plug port 18. In the example, in FIG. 5, the transfer passages are positioned at 54° from center line C. Consequently, as will be seen in FIGS. 6 and 7, when the plug member is rotated in the directions indicated by the arrows through the angle of 90° between the open and closed positions, the leak transfer passages and the sealing grooves do not at any time intersect. Nor will vertical groove elements 52a and 55a or transfer passages 66 and 67 ever cross flow ports 15 and 16 during such movement, thereby greatly minimizing loss of lubricant-sealant from the sealing grooves during the movements of the plug member.

By the employment of the sealing groove arrangement fed independently from separate lubricant-sealant reservoirs in combination with a separate leak-interceptor groove system, as above described, it becomes possible to provide automatic lubricant-sealing of plug valves of the solid or one-piece type in which leakage of line pressure between the plug member and its seat is effectively intercepted and utilized to accomplish the desired automatic sealing. At the same time lubricant will be maintained continuously between both the upstream and downstream sides of the valve plug and the body and thus assure not only more effective sealing but also easier turning of the plug member.

By the employment of the leak-interceptor groove arrangement it becomes unnecessary to machine the plug and seat surfaces to the extremely close tolerances heretofore required for such valves, since some degree of leakage becomes desirable.

Where, nevertheless, conditions of operation cause the plug member to become stuck or difficult to turn in its seat, the present invention includes means in combination with the sealing groove arrangement which may be employed to hydraulically lift or move the plug member from its seat to enable it to be turned. This additional means is best seen in FIGS. 1, 4 and 5 and includes a recess 75 in the upper end face of upper plug portion 17b, the bottom of which is connected by a passage 76 to upper sealing groove portion 55b. The outer end of recess 75 is closed by a bushing 77 having a bore 78 which provides communication between the interior of recess 75 and the portion of plug chamber 14 above the upper end of the plug member. A ball check valve 79 is positioned in recess 75 and resiliently biased to close passage 76.

When it becomes desirable to force plug member 17 off of its seat, lubricant-sealant may be injected through fitting 57 into the sealing groove systems in a quantity exceeding that necessary to fill the groove systems, including reservoirs 42 and 43. Any excess thus forced in under pressure will open check valve 79 and discharge into the portion of plug chamber 14 above the end of plug member 17. When movable barriers 44 and 45 are shouldered against snap rings 46 and 47, hydraulic force introduced through fitting 57 and bearing against the lower end of the plug will be shut off. However, this introduced hydraulic force will continue to bear against the upper end of the plug thus allowing the introduced pressure to unseat the plug from its tapered seat. When sufficient lubricant-sealant has thus been injected to fill the space above the plug member it will exert downward pressure on the upper end of the plug member sufficient to displace it downwardly from its seat which is permitted to occur by compression of spring 41.

Returning now to the back-sealing arrangement provided by shoulder 35 and seat 36, it should be noted that when stem 21 is inserted through bore 20 and screwed into threads 33, the stem will not be screwed down tightly but only so far as will position shoulder 35 a short distance below seat 36, such that rotation of stem through the 90° required to move the plug member between open and closed positions will not jam the shoulder against the seat. Whenever it becomes necessary to replace stuffing box packing 25, the orienting ring will be released to allow the stem to be turned more than 90° and the plug will then be rotated sufficiently to screw the stem upwardly until shoulder 35 is drawn tightly in contact with seat 36 to form a seal against leakage of fluid between the stem and the bonnet whereupon the packing may be replaced even though the valve is under full line pressure.

From the foregoing, it will be seen that I have provided an automatic lubricant-sealed plug valve of the solid or one-piece plug type which is highly efficient both in its sealing and lubricating aspects and which is relatively cheap to construct.

It will be understood that various changes and modifications may be made in the details of the illustrative embodiments within the scope of the appended claims without departing from the spirit of this invention.

What I claim and desire to secure by Letters Patent is:

1. An automatic lubricant-sealed plug valve, comprising, a valve casing having a chamber therein and upstream and downstream flow ports communicating with said chamber, a one-piece ported plug member rotatable in the chamber, cooperating sealing surfaces on the plug member and in the chamber, a sealing groove system in said sealing surfaces about each flow port when the plug member is in the closed position, means including sealant reservoir means for supplying sealant to both said groove systems, and an additional groove system in said sealing surfaces for intercepting and conducting line pressure fluid leaking between said surfaces into said reservoir means to force sealant therefrom into said sealing groove systems.

2. An automatic lubricant-sealed plug valve, comprising, a valve casing having a chamber therein and upstream and downstream flow ports communicating with said chamber, a one-piece ported plug member rotatable in the chamber, cooperating sealing surfaces on the plug member and in the chamber, a sealing groove system in said sealing surfaces about each flow port when the plug member is in the closed position, means including sealant reservoir means for supplying sealant to both said groove systems, and an additional groove system in said sealing surfaces for intercepting and conducting line pressure fluid leaking between said surfaces into said reservoir means to force sealant therefrom into said sealing groove systems, said additional groove system comprising a pair of circumferential grooves encircling the opposite ends of the plug member, a pair of transfer grooves connecting the circumferential grooves to each other on opposite sides of the plug member, and passage means providing communication between said additional groove system and said reservoir means.

3. An automatic lubricant-sealed plug valve, comprising, a valve casing having a chamber therein and upstream and downstream flow ports communicating with said chamber, a one-piece ported plug member rotatable in the chamber, cooperating sealing surfaces on the plug member and in the chamber, a sealing groove system in said sealing surfaces about each flow port when the plug member is in the closed position, means including a pair of sealant reservoirs for supplying sealant separately to said sealing groove systems, an additional groove system in said sealing surfaces for intercepting and conducting line pressure fluid leaking between said surfaces to said reservoirs to force sealant from said reservoirs into said sealing groove systems, separate sealant supply passages communicating with said reservoirs, and a single sealant supply means for introducing sealant simultaneously into both said supply passages.

4. In a plug valve, a chambered body having upstream and downstream flowways intersecting said chamber, a one-piece ported rotatable plug disposed in the chamber, co-acting sealing surfaces about said plug and in said chamber, a full port groove system in said sealing surfaces about each flowway when said plug is in closed position, a circumferential groove about said plug connected to one of said full port groove systems, a second circumferential groove about said plug connected to the other of said full port groove systems, and means to simultaneously introduce sealant to both said full port groove systems via said circumferential grooves.

5. In a plug valve, a chambered body having upstream and downstream flowways intersecting said chamber, a ported rotatable tapered plug disposed in the chamber, co-acting sealing and seating surfaces on said plug and in said chamber, resilient means normally holding said plug in seating engagement in said chamber, a full port sealing groove system in said sealing surfaces about each flowway when said plug is in the closed position, a pair of sealant reservoirs formed in the larger end portion of the plug and separately connected to each sealing groove system, means to introduce sealing material simultaneously into both said reservoirs, movable barrier means in each reservoir, an additional groove system in said sealing surfaces for intercepting and conducting line pressure fluid leaking between said surfaces to said reservoirs to force sealant therefrom into said sealing groove systems, a discharge passage from one of said sealing groove systems to above the smaller end of said plug, means limiting outward movement of said barrier means in the reservoirs whereby to cause sealant to discharge through said passage into said chamber above the smaller end of the plug to urge the plug from its seat in said chamber.

6. In a lubricated plug valve including a one-piece plug and having independent upstream and downstream sealing systems, each provided with a sealant reservoir having a movable barrier therein, an arrangement for simultaneously charging sealant into both systems, comprising a pair of circumferential grooves about the plug communicating separately with each of the reservoirs, a check valve-controlled passage connected to each groove, and a single sealant supply fitting communicating with both said passages.

7. In a lubricated plug valve, a housing, a one-piece plug having a transverse port rotatable in the housing, means to distribute sealant about said plug for sealing with said housing, said means including a sealant reservoir exposed to one end of said plug, movable barrier in said reservoir, at least two passages formed in said plug perpendicular to said port and positioned in spaced relation along the longitudinal axis of said port, said passages extending from said plug port to said end of said plug adjacent said reservoir, whereby when the plug is in open flow position pressure differentials created by fluid flow through said port will tend to withdraw matter entrapped in said housing exteriorly of one end of said plug, and a groove system between the plug and housing communicating with each of said passages.

8. In a plug valve, a housing having a chamber therein, a one-piece plug having a transverse port rotatable in the chamber, one end of said plug being spaced from the opposite wall of the chamber, at least two passages formed in said plug providing communication between longitudinally spaced points in the port and the space between said one end of the plug and the opposite wall of the chamber, whereby when the plug is in open flow position pressure differentials created by fluid flow through said port will tend to withdraw matter entrapped in said space through said passages into said port.

References Cited in the file of this patent

UNITED STATES PATENTS

| | | |
|---|---|---|
| 910,401 | Lunken | Jan. 19, 1909 |
| 2,077,191 | Staley | Apr. 13, 1937 |
| 2,321,233 | Mueller | June 8, 1943 |
| 2,360,599 | Volpin | Oct. 17, 1944 |
| 2,572,894 | Volpin | Oct. 30, 1951 |
| 2,573,238 | Wunn | Oct. 30, 1951 |
| 2,594,611 | Banides | Apr. 29, 1952 |
| 2,600,836 | Boyd | June 17, 1952 |
| 2,734,523 | Wiggans | Feb. 14, 1956 |
| 2,780,232 | Ney | Feb. 5, 1957 |